United States Patent [19]

Andros et al.

[11] Patent Number: 5,045,850
[45] Date of Patent: Sep. 3, 1991

[54] PAGING SYSTEM WITH CENTRALIZED PAGE SOURCE AND DISTRIBUTED PAGE SOURCES

[75] Inventors: Andrew A. Andros, Spring, Tex.; Thomas J. Campana, Jr., Chicago, Ill.

[73] Assignee: Telefind Corporation, Coral Gables, Fla.

[21] Appl. No.: 456,742

[22] Filed: Dec. 26, 1989

[51] Int. Cl.$^5$ .............................................. H04Q 7/00
[52] U.S. Cl. ....................... 340/825.44; 340/825.47; 340/825.26; 370/61; 379/60
[58] Field of Search ................. 340/825.44, 825.47, 340/825.52, 825.26, 825.07; 379/59, 60, 220, 258; 370/54, 61

[56] References Cited

U.S. PATENT DOCUMENTS

| | | | |
|---|---|---|---|
| 4,178,476 | 12/1979 | Frost | 340/825.44 |
| 4,644,351 | 2/1987 | Zabarsky et al. | 340/825.44 |
| 4,713,808 | 12/1987 | Gaskill et al. | |
| 4,875,039 | 10/1989 | Andros et al. | 340/825.44 |

FOREIGN PATENT DOCUMENTS 0193527  8/1986  Japan .............................. 340/825.44

Primary Examiner—Donald J. Yusko
Assistant Examiner—Peter S. Weissman
Attorney, Agent, or Firm—Antonelli, Terry, Stout & Kraus

[57] ABSTRACT

A paging network which generates pages at a page source storing a plurality of subscriber files chosen from subscriber files stored at a plurality of switches located in the network. The destination to which a page is to be transmitted is determined by the network transmitting the page to the switch storing a number identical to the identification added to the page by the page source. A plurality of locations may be connected to the network with each location generating pages having a different type of information.

31 Claims, 7 Drawing Sheets

THE FIVE LAYER MODIFIED X.25 PACKET

PAGING SYSTEM WITH CENTRALIZED PAGE SOURCE AND DISTRIBUTED PAGE SOURCES

APPENDIX

A Microfiche Appendix containing a code listing of a computer program to be used for implementing a page source providing stock market prices with the present invention containing 16 frames is attached hereto. The program may be executed on a UNIX 3B2 processor. The Appendix contains subject matter which is copyrighted. A limited license is granted to anyone who requires a copy of the program disclosed therein for purposes of understanding or analyzing the present invention, but no license is granted to make a copy for any other purpose, including the loading of a computer with code in any form or language.

DESCRIPTION

1. Technical Field

The present invention relates to paging systems which generate pages at a central location for distribution throughout a network containing a plurality of local paging services.

2. Background Art

Paging systems exist which transmit pages to paging subscribers generated under the control of a computer program. Predetermined subscriber specified parameters are compared with a variable information source. Pages are generated by the computer program when information specified by at least one subscriber specified parameter is found within the variable information source. For example, services exist which provide subscribers an alert when a stock price or other market priced item has moved in price through a price barrier. These services provide the subscriber with a page enabling the subscriber to take action to take advantage of the changed market information. While these systems are effective in providing information to subscribers, they have not been implemented over large geographic areas such as covering the United States and suffer from the disadvantage of requiring expensive transmission equipment also used by conventional local radio common carrier paging services.

Modern business depends increasingly on the rapid communication of time volatile information. Modern business decisions are influenced substantially by having the most reliable information. Business executives are required to make rapid decisions based upon rapidly changing information with a competitive advantage being obtained when rapidly changing information is quickly obtained. A need exists for providing information over large geographical areas or nationally from a centrally located page source which is broadcast by a paging network to mobile subscribers such as business executives.

FIG. 1 illustrates a prior art radio common carrier paging network disclosed in U.S. Pat. Nos. 4,866,431, 4,868,558, 4,868,562, 4,868,860, 4,870,410, 4,875,039, 4,876,538, 4,878,051 and 4,881,073 which are assigned to the assignee of the present invention. These patents are incorporated herein by reference in their entirety.

FIG. 1 illustrates a paging network 10 which provides worldwide paging capability. The network 10 is comprised of a plurality of local switches 12, a plurality of lata switches 14 and a plurality of hub switches 16 with each switch being located in a different geographical location within an area being serviced by the system. Repeating portions of the network 10 exist such as that portion of the network under the jurisdiction of hub switch #P. Communication links which are illustrated as a dotted arrow represent network structure which has been omitted for clarity that is identical to structure that is illustrated in detail. Additionally, one or more sublocal switches may be connected to each local switch 12 as discussed below with reference to FIG. 4. Each switch has jurisdiction over a geographical area. A single overall control program is used in each of the sublocal, local, lata and hub switches. A control program for the switches and circuitry for implementing the switches is disclosed in the aforementioned patents.

A local paging service 18 is connected to each of the local switches 12 which may offer other paging services than those provided by the network 10. The local paging service 18 is typically an existing radio common carrier paging service which services an area within broadcast range of the transmitter 15. The transmitter 15 may be either an analog or digital transmitter.

Communications between the local, lata and hub switches 12, 14 and 16 may be any existing communication medium. Each of these communication mediums are indicated schematically by a bi-directional arrow 20 which interconnects a local switch 12 to a lata switch 14, a lata switch 14 to a hub switch 16, and a hub switch 16 to another hub switch 16. Furthermore, the local switches 12 are connected to a local paging service 18 by a communication link 22 of any conventional nature, including wires connecting the local switch to the local paging service. Each switch is provided with a local telephone trunk 27 which functions as a maintenance port. Furthermore, dotted bidirectional lines 24 illustrate alternative communication paths between switches which may be used in case of malfunction or busy conditions.

The network 10 provides an integrated sublocal, local, regional and nationwide paging service that provides for pages to be called into any existing local paging service 18 by the making of a local telephone call on telephone trunk 28 connected to the local switch 12 in a conventional fashion as well as to any lata switch 14 throughout the network 10 by a local phone call to telephone trunk 26. The origination of pages anywhere within the network by local telephone call, preferably by calling a single number within the country (950-XXXX), avoids the telephone expense and system overhead caused by calling of a central switch.

FIG. 2 illustrates the subscriber files 54 which are stored by the plurality of local switches 12 throughout the network 10. Each subscriber file 54 contains data defining the service provided to a subscriber by the network 10. An important advantage of the network 10 is the distribution of the subscriber files 54 within the local switches. As a result, the network overhead for controlling the generation of pages and determining page destination is not performed by a central computer.

Each local switch 12 is allocated a capacity of, for example, 10,000 subscribers which are identified by a four-digit code stored in field 62 of the subscriber files 54.

Field 64 stores the subscriber's local telephone number within the area code serviced by the lata switch 14 having jurisdiction.

Field 66 is the subscriber's paging receiver identification code which uniquely identifies the subscriber and the paging receiver of the subscriber which is to receive pages throughout the network 10. The paging receiver identification code in a preferred embodiment consists of 8 digits with the four most significant digits geographically representing the area serviced by the associated lata switch 14 (country code as the most significant digit followed sequentially by area or city code lesser significant digits) and the four least significant digits being digits assigned to identify 10,000 subscribers within the jurisdiction of the local switch. The capacity of the system 10 is 100 million subscribers with the eight digit identification code. The least significant numbers of the identification code define subscribers of a specific local switch 12 within the jurisdiction of the lata switch 14.

Field 68 stores the service options which each subscriber may choose to have provided by the local paging service 18. The service option "a" is for no service which is a condition when an active subscriber does not wish to receive any pages such as may occur when the subscriber is on vacation or is otherwise desirous of not being paged for a period of time but does not wish to be removed from the subscriber base of the system. The service option "b" is for pages to be broadcast only by the transmitter 15 of the local paging service 18. The local service option has two suboptions (not illustrated) which permit the selection of numeric character transmission and the selection of alphanumeric character transmission. The service option "c" is for regional service which is for pages to be broadcast throughout all of the local paging services 18 which are within its lata switch jurisdiction. The service option "d" is for national paging which is for pages to be broadcast from the local switch 12 to at least one lata switch 14 other than the lata switch having jurisdiction over the local switch 12. While not illustrated, an international service option may be added. The regional, national and international service options permit the selection of two suboptions (not illustrated) of numeric and alphanumeric character transmission. The service option "e" is for a repeat of pages for any of the "b", "c" or "d" service options so that a page is broadcast more than once. The service option "f" is for data service which causes the page to be stored in a specified section of memory within a paging receiver receiving pages in the network. The service option "g" is for external data service which commands a paging receiver to output the page to the external data port. This option permits the paging receiver to support peripheral devices to provide a wide range of data services. Although not illustrated, the service options may further include sublocal and group paging.

The following additional fields are provided. The fifth field 70 is the subscriber's name and the subscriber's specified account number. The sixth field 72 is the subscriber's account number entry for purposes of interval billing by the local paging service 18. The seventh field 74 is the subscriber's page count (local, regional or national) which is a total of the number of pages made in a billing period. The eighth field 76 is the total number of data characters sent during the billing period. The ninth field 78 is the destination (area code(s)) of each of the pages. For local service, there is no area code specified. For regional service, the area code of the associated lata switch 14 having jurisdiction over the local switch 12 is specified and for national and international service, one or more area codes or other geographic identification identifying lata switches 14 other than the lata switch having jurisdiction over the local switch are specified. For international service, a country code may be used to identify lata switches 14 within a particular country. Any number of area codes may be specified but in a preferred embodiment of the invention, three area codes is a maximum number of lata switches 14 which may be specified as regions to receive pages from the local switch 12.

FIG. 3 illustrates a preferred transmission protocol to be used for transmitting packets of pages between the switches in the network 10. The protocol which is used is a modified X.25 protocol. As illustrated, each packet contains five separate layers. The first layer is the destination telephone number which is the receiving port to receive the page. With reference to FIG. 1 if a packet of X.25 formatted pages were to be sent from a first lata switch 14 to its associated hub switch 16 over communication path 20, the destination telephone number would be the telephone number of the hub switch. It should be further understood that the X.25 transmission protocol as described herein may be utilized with other types of communication mediums between switches such that a destination telephone number may be replaced with another form of address of the receiving switch. The second layer indicates the packet size field in terms of succeeding layers of information. Levels 3, 4 and 5 are provided which dictates that the packet size would store the number 3 to indicate the subsequently lower third, fourth and fifth layers. The third layer contains an origination switch address and a destination switch address which can be either telephone numbers or real addresses within the network 10. The fourth layer is the number of pages which are contained in a packet. As illustrated, this number may be any integer n. The fifth layer is one or more pages which each correspond to an individual page to be sent to a particular paging receiver.

Each message includes the following information. In accordance with standard X.25 protocol, a beginning of file header is included. Following the beginning of file header is a pager I.D. code which is the identification code of the destination paging receiver which is identical to the subscriber identification code 66 stored in the subscriber files 54 of the subscriber to receive the page. Following the pager I.D. code is the destination(s) of the page which is geographically descriptive of the switch to which the page is to be transmitted by the network and is added by the local switch 12 interrogating the destination field 78 of FIG. 2. The destination is a combination of country and area code as utilized by the telephone system to identify the area to which the page is destined. For each country, the same country code will be used so that if the paging system 10 as illustrated in FIG. 1 were to be utilized for the United States, the first digit of the destination would be a 1. Similarly, the destinations in other countries would be followed by different numbers identifying those countries followed by code which breaks up the identified country into smaller geographic regions. While the utilization of area codes under the telephone system facilitates the usage of the present invention, it should be understood that a destination which is not based on the telephone system is equally usable. The end of the file and file size information are part of a standard X.25 protocol.

FIG. 4 illustrates a block diagram of the sublocal portion 100 of the paging network 10 of FIG. 1. Like reference numerals identify like parts in FIGS. 1 and 4.

The sublocal portion 100 integrates the transmission of pages into the network 10 from one or more non-radio common carrier sublocal paging systems or services 168–174 through associated sublocal switches 160–166 to the local switch for broadcast by the transmitter 15 of the at least one local paging services 18 in the network. A sublocal paging system or service 184–190 transmits pages to groups of subscribers maintained in a sublocal switch subscriber file similar to the subscriber files 54 of the local switches 12 described above to provide specialized services typically of the type not provided by a radio common carrier paging service such as the local paging service 18. A separate sublocal switch is provided for each of the sublocal services or systems to be controlled. As illustrated, sublocal switches 160–166 are respectively associated with a private municipal paging system 168, a private hospital paging system 170, a stock quotation service 172 and any other type of private service 174. Each of the sublocal switches 160–166 has a telephone trunk 175. A sublocal switch may be used in conjunction with any non-radio common carrier service or system. As illustrated, the private municipal paging service 168 has a PABX or operated input 176, the private hospital paging system has a PABX or operator input 178, the stock quotation service 172 has a link to a stock computer 180, and the other private service has an input of any type of information 182. The function of these systems is to permit specialized forms of information to be broadcast in the form of a page to subscribers of the services or system 168–174 either by means of their associated sublocal transmitter 184–190 or by means of the local switch 12 controlling the transmitter 15 of the common carrier frequency of the local paging service 18. Each of the sublocal switches 160–166 are connected to the local switch by means of a communication link 184 which may be a telephone link. When the subscriber to the private systems or services elects to utilize the transmitter 15 of the local paging service 18, the subscriber calls the local switch 12 and enters a 4-digit secret code to obtain access to the subscriber files of the local switch. The subscriber then requests service other than sublocal transmission by the transmitters associated with the systems or services 168–174 by specifying a service option of either local service which corresponds to the local service provided by the local paging service 18 or some other wider level of broadcast service by entering the service option and area code(s) of the destinations. The sublocal switch receives each page from the associated system or service and formats the page with an identification code identifying one of the subscribers stored in the subscriber files of the local switch 12 identifying subscribers of the local paging service 18. When the local switch 12 receives a page from one of the sublocal switches via communication link 184, it compares the identification code of the page with the subscriber files stored in the local switch to find a match and determines any destination(s) of the page. For a local service option the page is processed as a page received from a lata switch 14 and broadcast by the transmitter 15. If regional, national, or international service has been elected, the local switch 12 forwards the page(s) to network 10 for transmission.

The telephone trunk 26 connected to each of the lata switches 14 permits pages to be inputted to the network without the placing of a long distance telephone call. A page originated by a local telephone call to a telephone switch 14 on trunk 26 includes a message portion preceded by the identification code of the paging receiver to receive the page preceded by the geographic identification code of the lata switch receiving the call on telephone trunk 26 to originate a page. The geographic code of a lata switch 14 enables a receiving local switch to differentiate the page from pages originating at the local switch to provide for transmission of the page in the correct direction throughout the network 10. Each subscriber identification code 66 in the network contains a field of the most significant bits which are the country code followed by three digits which comprise the area code in which the local switch 12 is located which stores the subscriber file 54 containing the identification code. Only one local switch 12 in the network stores a subscriber file 54 for each subscriber in the network which includes programmable destinations for determining the destination(s) in the network of where a page(s) is to be transmitted as discussed above in conjunction with FIG. 2. The network 10 forwards the page called to the trunk 26 to the lata switch 12 identified by the area code contained in the paging receiver identification code accompanying the page by utilization of the geographically descriptive digits within the identification code accompanying the page. The lata switch receiving the page originating by a call on trunk 26 compares the paging receiver identification code with the paging receiver identification codes stored in the lata switch which are all of the subscribers of each of the local switches 12 under the jurisdiction of the lata switch. When a match is found between a stored paging receiver identification code and the paging receiver identification code contained within the page received from a call to trunk 26, the lata switch then forwards the page to the local switch 12 having a subscriber file 54 containing the same number as the paging receiver identification code. The local switch 12 then functions to determine any destination(s) in the network 10 of where the page is to be transmitted by utilization of the destination field 78 of FIG. 2. It is not necessary for the person placing the request for a page by a local phone call to any one of the trunks 26 within the network 10 to have any knowledge of the subscriber's location given the fact that the subscriber and paging receiver identification code called in with the page is geographically descriptive of the lata switch 14 having jurisdiction over the local switch 12 storing the subscriber file 66 which permits the network 10 to forward the page to the local switch to determine any area destinations in the network to which the page is being transmitted by utilization of the destination field 78.

The paging network 10 of FIGS. 1 and 4 does not have a page source which stores a subscriber file of subscribers from a plurality of local switches 12 throughout the network for generating pages to be transmitted by the network. The sublocal switch and associated information services of FIG. 4 generate pages from a subscriber file which stores subscriber identification numbers identical to those contained in the local switch 12 having jurisdiction over the sublocal switch. Thus, the paging system and services 168–174 of the sublocal portion 100 of the network 10 do not permit messages to be transmitted to subscribers other than the subscribers stored in the sublocal switch to which the system or services are connected.

The trunk 26 which is connected to each of the lata switches 14 functions only as an input port and does not store any subscriber identification codes of any subscribers in the network. The trunk 26, independent of the caller, does not have any page generating capability including a subscriber file of subscribers resident in a plurality of local switches 12 throughout the network.

The network 10 has the disadvantage of not providing integration of specialized paging sources into the network which have a subscriber base from a plurality of local switches contained in the network. Specialized paging services, such as stock quotation services, do not have the transmission efficiency of the network 10. The network 10 does not provide pages from diverse paging sources each having subscriber files from a plurality of subscribers having subscriber files stored by a plurality of local switches 12.

Electronic signs, such as billboards, have been developed which display information which is remotely programmable by a telephone line. To remotely program the display of an electronic sign a telephone connection is required, such as a leased line, which has a minimum monthly charge. Information to be displayed is changed by a telephone call placed from a central source to the sign. This system is disadvantageous from the standpoint of expense of operation and requiring a telephone connection which typically is hardwired.

DISCLOSURE OF INVENTION

The present invention integrates page sources, which provide special paging services to a group of subscribers having subscriber files stored by a plurality of switches in a paging network which determine destinations of pages in the paging network, into a general purpose paging network. The page sources generate pages under the control of a control program or from the input of alphanumeric information by an input device associated with the page source(s) which are coupled to the paging network. With the invention, the page source may be connected to a local switch 12, a lata switch 14 or a hub switch 16. The page source may generate pages in accordance with one or more page generation control parameters which are stored with each subscriber identification code stored by the page source to determine the criteria under which pages are to be generated. The types of pages which are generated are diverse such as, but not limited to, transmitting stock quotation information, weather reports, sports scores or information to be displayed on electronic signs. The page source may also generate pages by data inputted to the page source by an input device such as, but not limited to, a keyboard. The pages generated by the page source contain information which may be numeric or alphanumeric and the subscriber identification code obtained from the identification code file stored by the page source which identification code is identical to the paging receiver identification code of the paging receiver to receive the page transmitted by the network and the identification code 66 stored by one of the local switches. In most applications the pages are generated by the processing of information from an information source which is compared with at least one page generation control parameter specified by the subscriber to the page source to generate a page each time a predetermined condition specified by the at least one page generation control parameter exists in the variable source of information.

The present invention has a number of advantages over the prior art. The invention permits paging sources of a diverse nature serving groups of subscribers of the local paging services in the network to be integrated into the paging network at low cost to generate pages for subscribers which have subscriber files stored by a plurality of local switches 12 throughout the network. With the invention, pages may be generated by a paging source by a control program which maintains subscriber files of subscribers stored by a plurality of local switches 12 throughout the network without requiring the processing capability of a sublocal, local, lata or hub switches. As a result, the cost of the processing required by the page source is only influenced by the computing power necessary to implement the program for generating the pages in accordance with the page generation control parameters associated with each subscriber stored by the page source and the formatting of the pages to include the subscriber identification number which is identical to the paging receiver identification code of the receiver to receive the page and an identification code 66 stored by one of the local switches 12. The pages produced by the paging source are connected to one of the local switch 12, lata switch 14 or hub switch 16 which formulates them into a packet having a variable number of pages in accordance with the teachings of the above-described patents and described above with reference to FIG. 3.

A paging network containing a plurality of switches which are connected together for transmitting pages between switches including a plurality of local switches with a plurality of the local switches containing at least one subscriber file with a subscriber file containing an identification number identifying a paging receiver receiving pages transmitted in the network and a programmable destination field associated with a subscriber file for storing an identification of any switch in the network where a page is to be transmitted by the network for transmission to a paging receiver and at least one other switch through which pages are transmitted from one local switch to at least one other local switch in accordance with the invention includes a page source storing a plurality of the identification numbers stored by a plurality of local switches chosen from the identification numbers stored by a plurality of the local switches, an identification number stored by the page source identifying a paging receiver to which pages generated by the page source are to be transmitted by the network, the page source generating pages to be transmitted to a plurality paging receivers receiving pages in the network including information from the page source and the identification number of the paging receiver chosen from one of the plurality of stored identification numbers which is to receive the page and the page source being connected to one of the switches in the network for receiving pages generated by the page source; and wherein the network transmits a page generated by the page source to the local switch having a subscriber file containing a number identical to the identification number contained in the page; and the local switch to which the page is transmitted by the network receiving the page determines a destination switch to which the page generated by the page source is to be transmitted by the network by matching the identification number contained in the page with an identification number stored in a subscriber file storing an identical identification number stored by the local switch receiving the page from the network and determining the destination switch from the matched subscriber file to which the page generated by the page service is to be transmitted by the network, adds the destination switch to the page and couples the page to the network for transmission to the destination switch by the network. The switch to which the page source is connected may be a local switch, a lata switch or a hub switch. The page source stores at least one information parameter associated with each identification number which is processed by a computer program to generate pages as a function of the information parameter and an information source coupled to the page source. The at least one parameter may comprise at least one stock price, the information source is a source of stock price information from a stock exchange and a page is generated when a stock price obtained from the source of stock price information passes a stock price specified by the at least one parameter. The page source alternatively may comprise an input device for composing pages which may be a keyboard with the keyboard composing display information for an electronically variable sign in which at least one paging receiver is located at a location of a variable sign.

A method of transmitting a page from a page source storing a plurality of identification numbers chosen from identification numbers stored by a plurality of local switches with an identification number identifying a paging receiver to which pages generated by the page source are to be transmitted by a paging network comprising a plurality of local switches and at least one other switch with pages including information from the page source and the identification number of the paging receiver which is to receive the page chosen from one of the plurality of stored identification numbers in accordance with the invention includes coupling a page from the page source to one of the switches in the network; transmitting the page coupled to the switch to a local switch in the network having a subscriber file storing an identification number identical to the identification number contained in the page coupled to the switch; determining a destination switch in the network to which the page transmitted to the local switch is to be transmitted from the subscriber file storing an identification number identical to the identification number of the page; adding the determined destination switch to the page to which the page is to be transmitted by the network for which a destination has been determined; and transmitting the page to which the destination switch has been added through the network to the destination switch. The switch to which the page is connected may be a local switch or one of the at least one other switches which may be a lata switch or a hub switch. The page source stores at least one information parameter associated with an identification number which is processed by a computer program to generate pages using the information parameter and an information source coupled to the page source. The at least one information parameter comprises at least one stock price, the information source is a source of stock price information from a stock exchange and a page is generated when a stock price obtained from the source of stock price information passes a stock price specified by the at least one parameter. The page source comprises an input device for composing pages which may be a keyboard. The input device composes display information for display on an electronically variable sign and the network transmits the page form the page source to a paging receiver coupled to the sign.

A paging network in accordance with the present invention includes a page source storing a plurality of identification numbers chosen from identification numbers stored by a plurality of switches in the network, an identification number stored by the page source identifying a paging receiver to which a page generated by the page source is to be transmitted by the network, the page source generating pages to be transmitted to at least one paging receiver receiving pages in the network including information from the page source and the identification number of the paging receiver to receive the page, the page source being connected to one of the switches; and a switch in the network storing an identification number identical to the identification number of the paging receiver receiving the page, determining a destination switch in the network to which the page is to be transmitted by the network from destination information stored in the destination field stored in association with the identification number identical to the identification number contained in the page and adding the destination switch to the page and coupling the page to the network for transmission by the network. The plurality of switches storing the identification number switches and the network further comprises a plurality of lata and hub switches through which pages are transmitted by the network.

BEST MODE FOR CARRYING OUT THE INVENTION

Figure 1:
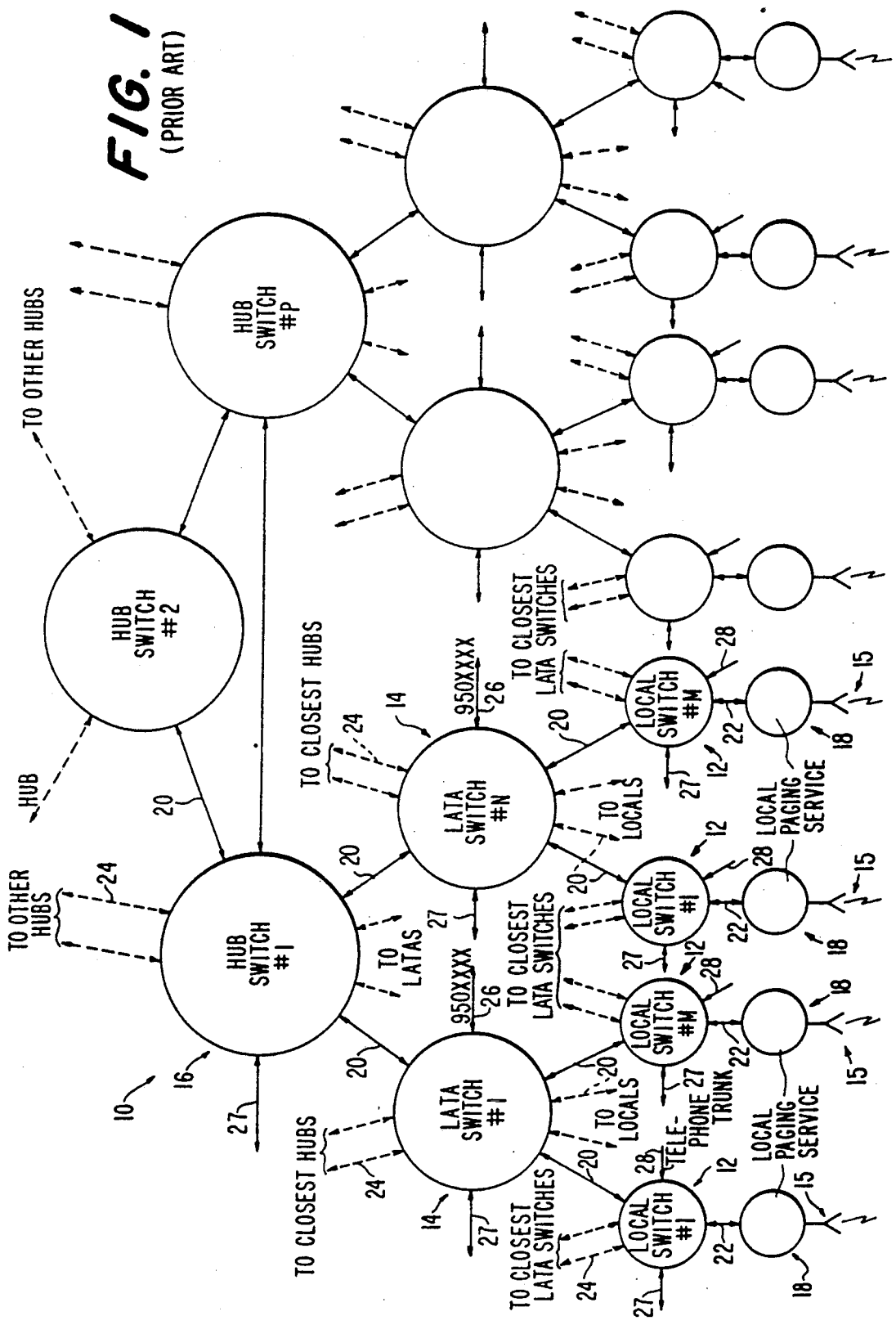
FIG. 1 illustrates a prior art paging network.
Figure 2:
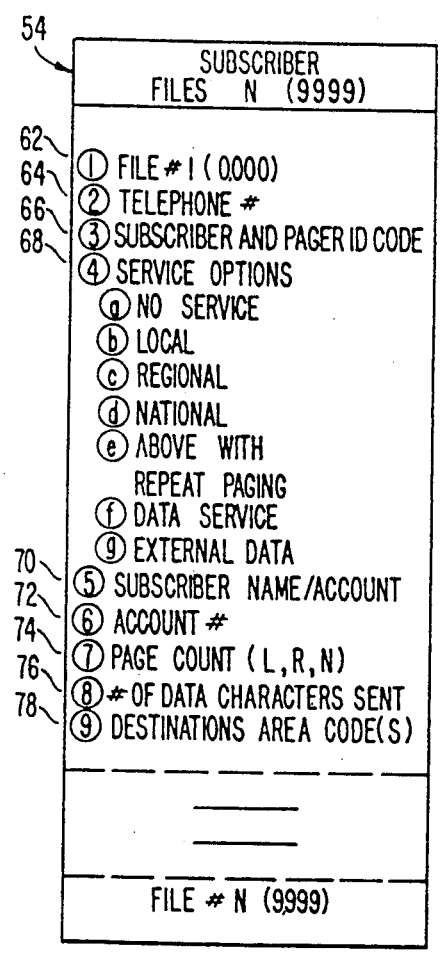
FIG. 2 illustrates the prior art subscriber files stored by local switches in the network.
Figure 4:
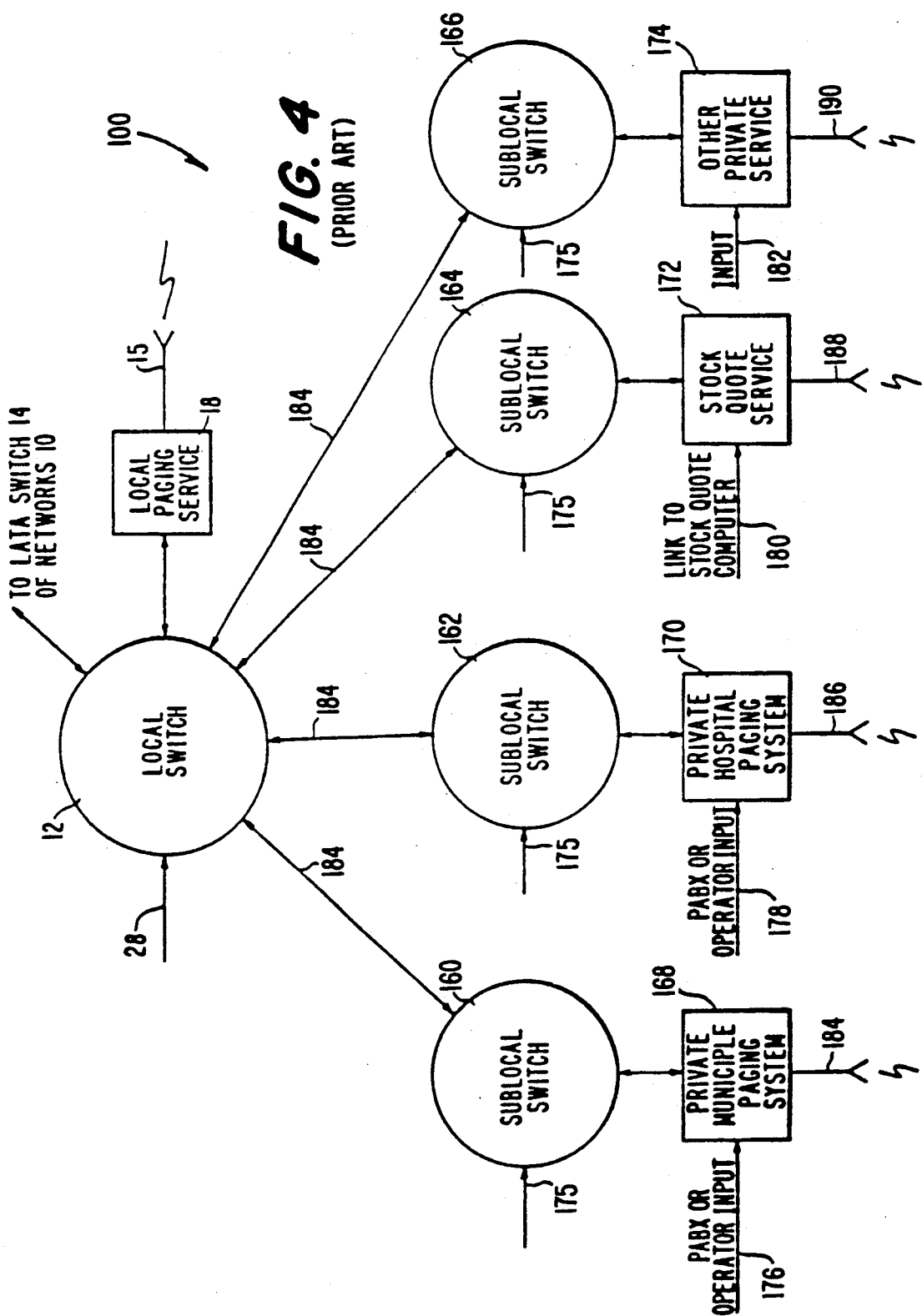
FIG. 4 illustrates a portion of the prior art paging network of FIG. 1 which contains non-radio common carrier paging services or systems.
Figure 5:
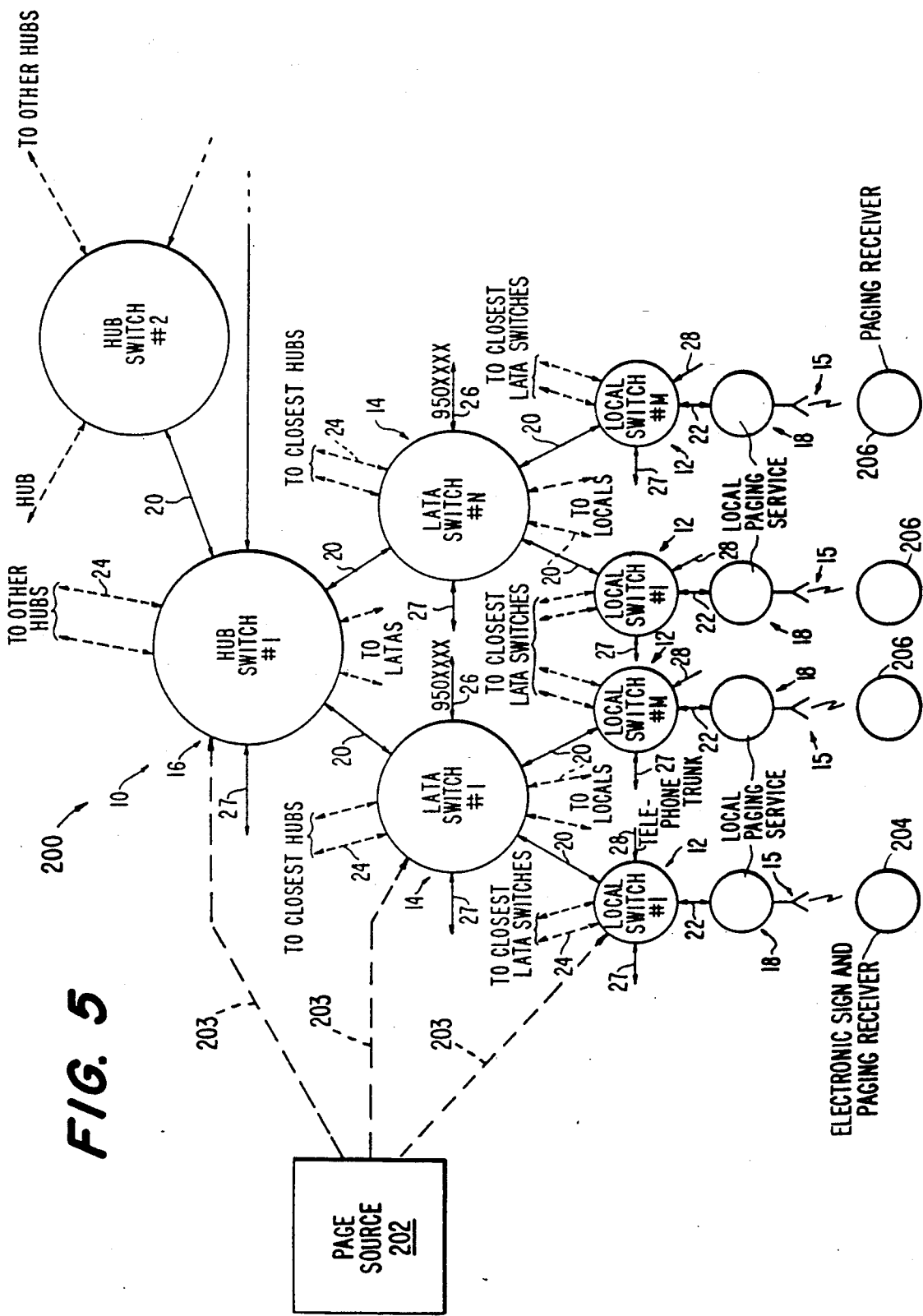
FIG. 5 illustrates a block diagram of a paging network in accordance with the present invention.

FIG. 5 illustrates a paging network 200 in accordance with the present invention. Like reference numerals identify like parts in FIGS. 1-5. The paging network 200 of the present invention integrates a page source 202 with a general purpose paging network as described with reference to FIGS. 1-4. Each page source 202 may be connected to a local switch 12, a lata switch 14 or hub switch 16. The alternative connection is identified by the dotted line connection 203 which may be any form of connection including hard wired connections. The location of each page source 20 may be at the location of the switches 12, 14 or 16 or, alternatively, at a location remote from the location of the switch. The page source 202 stores a plurality of identification numbers which are identical to the identification numbers contained in subscriber files 66 stored by a plurality of local switches 12 throughout the network and generates pages to be transmitted by the network 200 to the subscribers identified by the identification numbers stored in the page source. The page source 202 may be any source of pages including, but not limited to a programmed computer which generates pages by processing at least one information parameter associated with an identification number stored within the page source which is processed by a computer program to generate pages using the at least one information parameter and an information source coupled to the page source or an input device which composes pages for paging receivers having identification numbers stored in the page source. A program for generating pages from a market price information feed from a stock exchange is contained in the above-referenced Appendix. Without limitation, the computer program may generate pages containing market information which is volatile in time such as, but not limited to, stock market prices, sports scores, weather information or any other type of information which is to be periodically sent to subscribers of the network 10 which is generated at predetermined times or upon the occurrence of predetermined conditions which occur in an information source coupled to the page source 202. The input device (302 of FIG. 6) of the page source may be used to compose pages to be transmitted by the network to an electronic sign 204 which has a paging receiver associated with the electronic sign for receiving information from the page source to be displayed on the electronic sign. The electronic sign may be of any size including large displays such as billboards. Electronic signs are well known and permit the display of information from an input device which in accordance with the paging system 200 of the present invention is a paging receiver mounted on the electronic sign. A preferred form of paging receiver is disclosed in U.S. Pat. Nos. 4,849,750, 4,851,830, 4,857,915, 4,853,688, 4,928,100 and 4,935,732 which are assigned to the assignee of the present invention and which are incorporated herein by reference in their entirety. The benefit of utilizing the paging receiver associated with the electronic sign 204 is the elimination of the telephone connection of the prior art and the attendant expense of making a long-distance phone call to each of the signs which are to be programmed to provide a different display. The network 200 transmits pages to a plurality of paging receivers 206 which are in broadcast range of the transmitters 15 associated with the plurality of local paging services 18. As illustrated in FIG. 5, the network switches are identical to the switches contained in FIG. 1 and may include the sublocal switches illustrated in FIG. 4.

Figure 6:
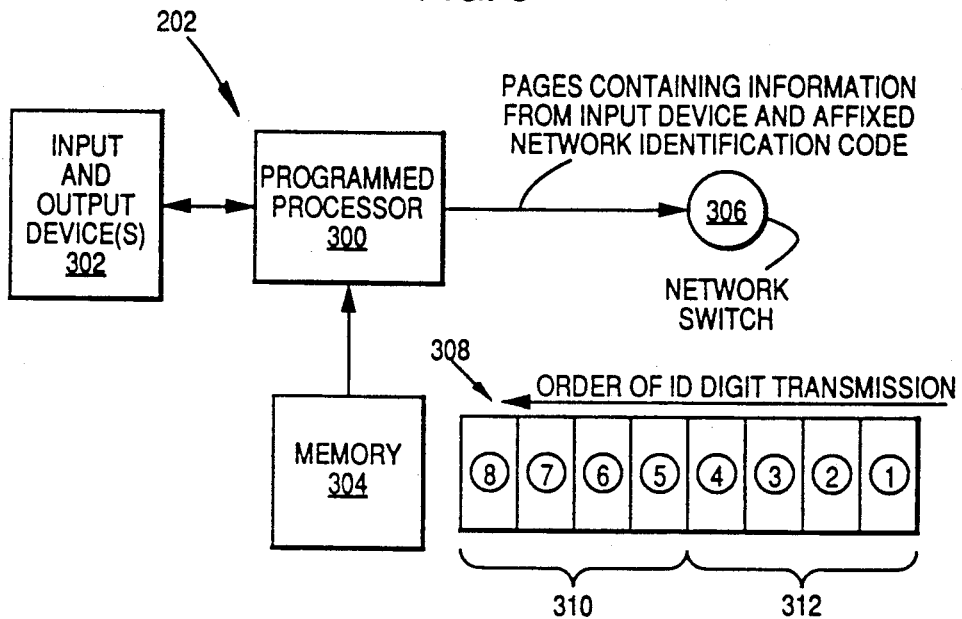
FIG. 6 illustrates a first embodiment of the page source of FIG. 4.

FIG. 6 illustrates a block diagram of a paging source 202 which may be utilized for generating numeric or alphanumeric pages for applications such as changing the display of an electronic sign 204. The page source 202 includes a programmed processor 300 which may be a personal computer or other computer which is programmed for the specific type of page to be generated by the page source 202. At least one input and output device 302 is coupled to the programmed processor 300. The input and output device 302 functions to permit the composing of pages to be transmitted to the subscribers having subscriber files stored in a plurality of local switches 12 throughout the network. Memory 304 stores the plurality of identification numbers which identify subscribers identified by the subscriber files 54 stored by the plurality of local switches 12 throughout the network and any additional information for the generation of the pages including control program. The invention is not limited to any type of control program. In view of the unlimited applications of the page source 202 for composing pages to be broadcast to subscribers identified by the subscriber files 54 stored in a plurality of local switches 12 throughout the network, the memory 304 will store information which is suited for the particular application of the page source in addition to the aforementioned identification numbers. The programmed processor 300 processes information inputted from the at least one input and output device 302 and from the memory 304 to generate a page with an affixed network identification code. The format of the pages is identical to that disclosed in the aforementioned patents. The affixed network identification code, which is identical to the paging receiver identification code and the identification code 66 stored within each subscriber file 54 contains a plurality of digits which are geographically descriptive. As disclosed in the aforementioned patents, preferably, the geographically descriptive digits are comprised of a first digit which is a country code and three additional digits which are the area code of the lata switch 14 having jurisdiction over the local switch 12 which stores an identification number in a subscriber file which is identical to the network identification code affixed to the page. The network switch 306 may be a local switch 12, lata switch 14 or hub switch 16.

The network identification code 308 which is appended to each page generated by the page source 202 is described as follows. Each circled number indicates the significance of the digit of the identification code with the most significant digit being identified by the largest number. The field 310 is the country code and the area code of the geographic location over which a lata switch 14 has jurisdiction where the local switch 12 is located which stores an identification number 66 in a subscriber file 54 which is identical to the network identification code affixed to the page. The most significant digit (8) is the country code followed by the next three most significant digits (7-5) which comprise the area code of the location in which the local switch storing a subscriber file containing an identification code identical to the network identification code is located. For example, a local switch in the Chicago area would have a field 310 of "1312". The field 312 contains the digits which identify the lata switch geographical area of jurisdiction where a subscriber file is stored in a local switch 12 containing an identification code identical to the network identification code affixed to the page. The arrow pointing to the left illustrates the order of transmission of the digits for the identification code with the least significant digit being transmitted first sequentially followed by digits of increasing significance with the most significant digit being last. The purpose for the transmission order of the digits of the paging receiver identification code is for saving of battery life in the paging receiver and is disclosed in U.S. Pat. No. 4,857,915.

Figure 3:
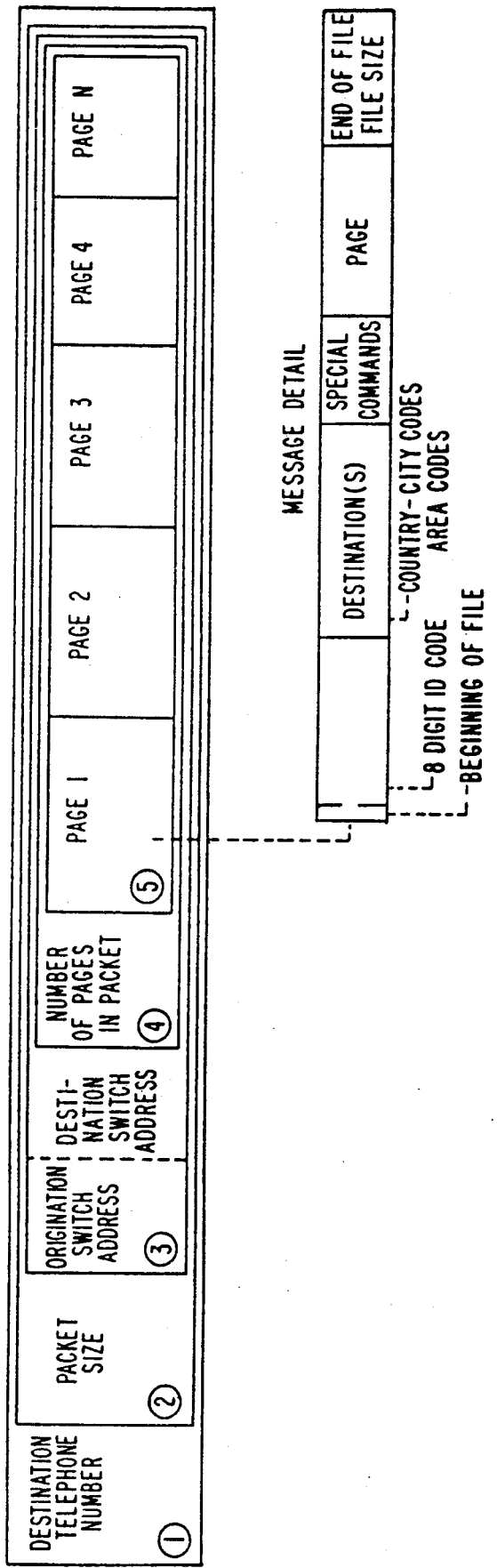
FIG. 3 illustrates the prior art protocols of a packet and page in accordance with the present invention.
Figure 7:
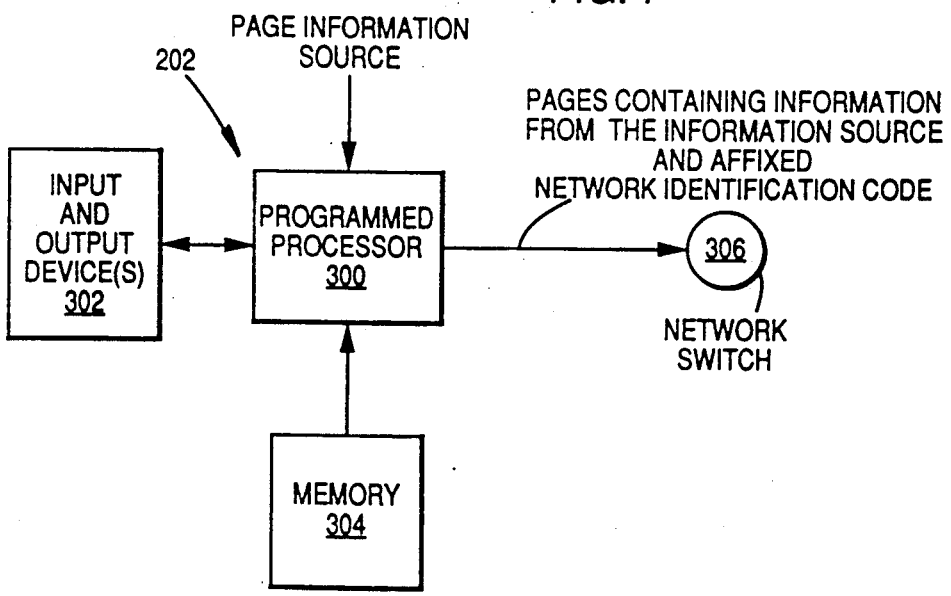
FIG. 7 illustrates a second embodiment of a page source of FIG. 5.

FIG. 7 illustrates a second embodiment of a page source 202 which may be utilized in the system of FIG. 3. Like reference numerals identify like parts in FIGS. 6 and 7. While not illustrated, the network identification code affixed to pages generated by the page source of FIG. 7 is identical to the network identification code of FIG. 6. The embodiment of FIG. 7 differs from that of FIG. 6 in that the program of processor 300 is responsive to a page information source which provides information varying with time. The page information source may be any information source which is used by the programmed processor for generating pages in combination with at least one page generation control parameter as described below and with reference to FIG. 8. Individual subscribers having identification codes stored by a plurality of local switches 12 in the network 10 specify at least one control parameter for generating pages which contain information from the page information source. For example, the page information source may be market information such as, but not limited to stock quotation information obtained from a stock exchange, weather information, sports scores or any other source of information which is variable in time for which a subscriber to paging services in the network 200 desires to receiver pages containing updated information. For example, a subscriber could elect when subscribing to services provided by the page source 202 to have sports scores transmitted periodically for college or professional football games or other types of sports. Halftime and/or final scores could be transmitted for sports games. Updated weather reports could be transmitted to persons who desire to have updated weather information for purposes of travel or any other purpose in which actions are varied in response to weather information. Special purpose computer programs are executed by the program processor 300 for the purpose of generating pages to be transmitted to a plurality of subscribers of the network 200 having identification numbers stored in the memory 304 and in subscriber files of a plurality of local switches 12 throughout the network.

An advantage of the present invention is that the processing overhead required for generating the pages for a selected group of subscribers of the network 10 is sized in accordance with the subscriber base for a group of paging receivers which are to receive the special pages. Switching functions associated with local 12, lata 14 and hub switches 16 are not executed by the programmed processor 300 of the page source 202 which eliminates network overhead from the cost of page source 202. Additionally, as a result of the page source 202 producing pages with the affixed network identification code, the intelligence of the network 10 is utilized to forward the pages to the local switch 12 containing a subscriber file storing an identification number identical to the identification number transmitted with the page to permit determination of each destination of the page in the network 200 by the local switch 12 receiving the page. As a result, the addition of page sources 202 which generate pages of a diverse nature for particular groups of subscribers of the network 10 is accomplished without additional overhead associated with the switching functions of the network and the transmission of the pages to the correct location in the network. The intelligence of the network in determining any destination to which a page is to be transmitted from a page source 202 is obtained by merely affixing the identification code of a subscriber stored in a subscriber file 54 of one of the local switches 12 in the network to the page.

Figure 8:
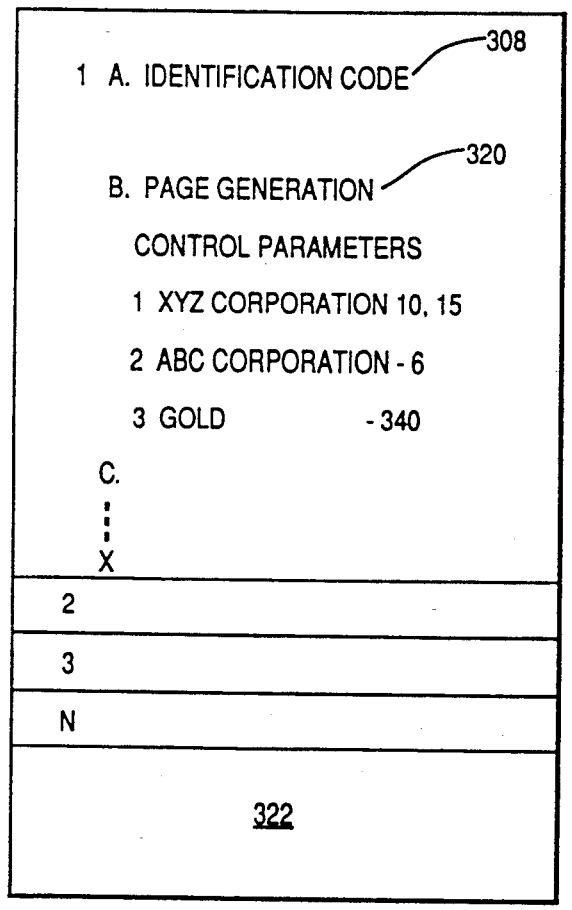
FIG. 8 illustrates a memory map of the page source of FIG. 7.

FIG. 8 illustrates an example, without limitation, of a memory map of a portion of the information which may be stored in the memory 304 of the page source 202. The memory 304 includes a plurality of records which are numbered sequentially from number 1—N with N being a variable number. The number N is theoretically as large as the total number of subscribers stored by all of the local switches 12 in the network. Associated with each record is a plurality of types of information. The first type of information is the identification code 308 as described above with reference to FIG. 6 and which is identical to an identification number 66 stored in a subscriber file 54 of one of the local switches 12 in the network. Identification codes 308 for the plurality of records are identical to identification codes 68 stored by a plurality of local switches. At least one page generation control parameter 320 is stored in association with each record such as record no. 1. A plurality of page generation control parameters may be stored. For example, if the page source 202 is providing stock quotation information the subscriber to the page source 202 may specify at least one stock or commodity for which the subscriber wishes to monitor price fluctuations. For example, the first record is a stock for XYZ corporation with the numbers 10 and 15 identifying upper and lower price limits which, if the price moves outside the range between these limits, requires the generation of a page alerting the subscriber of the price fluctuation. The variable information from the page information source is a feed from a stock exchange and/or a commodities exchange which enables determination to be made when the current price exceeds the specified limits. The second record is a stock for ABC Corporation with the price limit being an upper price of $6.00 per share for which the subscriber wishes to be notified when the price exceeds the stated limit. The third record is the commodity gold with the subscriber wishing to be informed when the price of gold rises above $340 per ounce.

The additional records C . . . X represent additional market variable commodities. The additional memory area 322 contains the program executed by the programmed processor 300 and any additional information required for operation of the page source 202. A suitable program for implementing the generation of pages which are coupled to a network switch 306 which contain stock quotation information is contained in the attached appendix.

From the viewpoint of promoting network efficiency, the page source 202 provides greater network efficiency when connected either to a lata switch 14 or a hub switch 16 than to a local switch 12. This is a result of the fact that statistically the identification numbers stored in the page source 202 which identify a number within subscriber files stored by a plurality of local switches 12 are more likely spread out throughout the network. Therefore, it is most likely that pages generated by the page source 202 will require transmission through at least one lata switch 14 for the page to be transmitted to the local switch 12 for determining any destination to which a page is to be transmitted. The greatest improvement in network efficiency should be achieved by connection of the page source 202 to a hub switch 16 given the fact that hub switches for a large distributed subscriber base, such as that stored by a plurality of local switches 12, are more geographically centrally located than any lata switch 12 in the network. The closer the page source 202 at the point of connection to a switch in the network 200 is to all of the local switches in the network 12 to which pages are transmitted for destination determination produces the highest efficiency of transmission.

While the invention has been described in terms of its preferred embodiment, it should be understood that numerous modifications may be made thereto without departing from the spirit and scope of the invention as defined by the appended claims. It is intended that all such modifications fall within the scope of the appended claims.

We claim:

1. A paging network containing a plurality of switches which are connected together for transmitting pages between switches including a plurality of local switches with a plurality of the local switches containing at least one subscriber file with a subscriber file containing an identification number identifying a paging receiver receiving pages transmitted in the network and a programmable destination field associated with a subscriber file for storing an identification of any destination switch in the network where a page is to be transmitted by the network for transmission to a paging receiver and at least one other switch through which pages are transmitted from one local switch to at least one other local switch comprising:

a page source storing a plurality of the identification numbers chosen from identification numbers stored by a plurality of local switches, an identification number stored by the page source identifying a paging receiver to which pages generated by the page source are to be transmitted by the network, the page source generating pages to be transmitted to a plurality of paging receivers receiving pages in the network including information from the page source and the identification number of the paging receiver chosen from one of the plurality of stored identification numbers which is to receive the page and the page source being connected to one of the switches in the network for receiving pages generated by the page source; and wherein the network transmits a page generated by the page source to the local switch having a subscriber file storing a number identical to the identification number contained in the page; and the local switch to which the page was transmitted by the network receiving the page determines the destination switch to which the page generated by the page source is to be transmitted by the network by matching the identification number contained in the page with an identification number stored in the subscriber file storing an identical identification number stored by the local switch receiving the page from the network and retrieves the destination switch from the destination field of the matched subscriber file to which the page generated by the page source is to be transmitted by the network, adds the destination switch to the page and couples the page to the network for transmission to the destination switch by the network.

2. A paging network in accordance with claim 1 wherein:
    the switch to which the page source is connected is a local switch.

3. A paging network in accordance with claim 1 wherein:
    the switch to which the page source is connected is one of the at least one other switches; and
    information contained within the identification number of the page is used by the network to transmit the page from the switch to which the page source is connected to the local switch having a subscriber file storing an identification number identical to the identification number contained in the page.

4. A paging network in accordance with claim 3 wherein:
    the other switch to which the page source is connected is a lata switch.

5. A paging network in accordance with claim 3 wherein:
    the other switch to which the page source is connected is a hub switch.

6. A paging network in accordance with claim 1 wherein:
    the page source stores at least one information parameter associated with an identification number which is processed by a computer program to generate pages using the at least one information parameter and an information source coupled to the page source.

7. A paging network in accordance with claim 6 wherein:
    the at least one information parameter comprises at least one stock price, the information source is a source of stock price information from a stock exchange and a page is generated when a stock price obtained from the source of stock price information passes a stock price limit specified by the at least one parameter.

8. A paging network in accordance with claim 1 wherein:
    the page source comprises an input device for composing pages.

9. A paging network in accordance with claim 1 wherein:
    the input device is a keyboard.

10. A paging network in accordance with claim 8 wherein;
    the input device composes display information for an electronically variable sign and at least one paging receiver is located at a location of an electronically variable sign.

11. A paging network in accordance with claim 3 wherein:
    the page source stores at least one information parameter associated with an identification number which is processed by a computer program to generate pages using the at least one information parameter and an information source coupled to the page source.

12. A paging network in accordance with claim 11 wherein:
    the at least one information parameter comprises at least one stock price, the information source is a source of stock price information from a stock exchange and a page is generated when a stock price obtained from the source of stock price information passes a stock price limit specified by the at least one parameter.

13. A paging network in accordance with claim 3 wherein:
    the page source comprises an input device for composing pages.

14. A paging receiver in accordance with claim 13 wherein:
    the input device is a keyboard.

15. A paging network in accordance with claim 13 wherein:
    the input device composes display information for an electronically variable sign and at least one paging receiver is located at a location of an electronically variable sign.

16. A method of transmitting a page from a page source storing a plurality of identification numbers chosen from identification numbers stored by a plurality of local switches with an identification number identifying a paging receiver to which pages generated by the page source are to be transmitted by a paging network comprising a plurality of the local switches and at least one other switch with pages including information from the page source and the identification number of the paging receiver which is to receive page chosen from one of the plurality of stored identification numbers comprising:

coupling a page from the page source to one of the switches in the network;

transmitting the page coupled to the switch to a local switch in the network having a subscriber file storing an identification number identical to the identification number contained in the page coupled to the switch;

determining a destination switch in the network to which the page transmitted to the local switch is to be transmitted from the subscriber file storing an identification number identical to the identification number stored in the page;

adding the determined destination switch to the page to which the page is to be transmitted by the network for which a destination switch has been determined; and transmitting the page to which the destination switch has been added through the network to the destination switch.

17. A method in accordance with claim 16 wherein: the switch to which the page is connected is a local switch.

18. A method in accordance with claim 16 wherein: the switch to which the page is connected is one of the at least one other switches; and information contained within the identification number of the page is used by the network to transmit the page from the switch to which the page source is connected to the local switch having a subscriber file storing an identification number identical to the identification number contained in the page.

19. A method in accordance with claim 18 wherein: the other switch to which the page source is connected is a lata switch.

20. A method in accordance with claim 18 wherein: the other switch to which the page source is connected is a hub switch.

21. A method in accordance with claim 16 wherein: the page source stores at least one information parameter associated with an identification number which is processed by a computer program to generate pages using the information parameter and an information source coupled to the page source.

22. A method in accordance with claim 21 wherein: the at least one information parameter comprises at least one stock price, the information source is a source of stock price information from a stock exchange and a page is generated when a stock price obtained from the source of stock price information passes a stock price limit specified by the at least one parameter.

23. A method in accordance with claim 16 wherein: the page source comprises an input device for composing pages.

24. A method in accordance with claim 23 wherein: the pages are composed by a keyboard.

25. A method in accordance with claim 23 wherein: the input device composes display information for display on an electronically variable sign and the network transmits the page from the page source to a paging receiver coupled to the sign.

26. A method in accordance with claim 18 wherein: the page source stores at least one information parameter associated with an identification number which is processed by a computer program to generate pages using the information parameter and an information source coupled to the page source.

27. A method in accordance with claim 26 wherein: the at least one information parameter comprises at least one stock price, the information source is a source of stock price information from a stock exchange and a page is generated when a stock price obtained from the source of stock price information exceeds a stock price specified by the at least one parameter.

28. A method in accordance with claim 19 wherein: the page source stores at least one information parameter associated with an identification number which is processed by a computer program to generate pages using the information parameter and an information source coupled to the page source.

29. A method in accordance with claim 20 wherein: the page source stores at least one information parameter associated with an identification number which is processed by a computer program to generate pages using the information parameter and an information source coupled to the page source.

30. A paging network comprising:

a page source storing a plurality of identification numbers chosen from identification numbers stored by a plurality of switches in the network, an identification number stored by the page source identifying a paging receiver to which pages generated by the page source are to be transmitted by the network, the page source generating pages to be transmitted to at least one paging receiver receiving pages in the network including information from the page source and the identification number of the paging receiver to receive the page, the page source being connected to one of the switches; and a switch in the network storing an identification number identical to the identification number of the paging receiver receiving the page, determining a destination switch in the network to which the page is to be transmitted by the network from destination information stored in association with the identification number identical to the identification number contained in the page, adding the destination switch to the page and coupling the page to the network for transmission by the network.

31. A paging network in accordance with claim 30 wherein:

the plurality of switches storing the identification numbers are local switches;

the network further comprises a plurality of lata and hub switches through which pages are transmitted by the network; and information contained within the identification number of the page is used by the network to transmit the page from the switch to which the page source is connected to the switch having a subscriber file storing a number identical to the identification number contained in the page.

* * * * *